United States Patent [19]

Krajewski et al.

[11] Patent Number: 4,762,310
[45] Date of Patent: Aug. 9, 1988

[54] PIVOT BUSHING ASSEMBLY APPLICATION

[75] Inventors: Casimir Krajewski, Rochester Hills; Randolph I. Melville, Fenton; William W. Porter, Plymouth, all of Mich.

[73] Assignee: General Motors Corporation, Detroit, Mich.

[21] Appl. No.: 90,845

[22] Filed: Aug. 31, 1987

[51] Int. Cl.⁴ .................... F16F 1/38; F16F 7/00; B60G 13/00; B60G 15/02
[52] U.S. Cl. ................... 267/141.2; 267/270; 267/281; 267/293
[58] Field of Search .............. 267/263, 269, 270, 273, 267/276, 279, 281, 284, 292, 293, 67, 120, 141.2, 141.3, 141.7; 384/295

[56] References Cited

U.S. PATENT DOCUMENTS 2,324,997 7/1943 Brown .................................. 267/269
3,182,986 5/1965 Brockman ....................... 267/270 X

FOREIGN PATENT DOCUMENTS 0182044 5/1955 Fed. Rep. of Germany ...... 267/293

Primary Examiner—Andres Kashnikow
Assistant Examiner—Richard Potosnak
Attorney, Agent, or Firm—Dean L. Ellis

[57] ABSTRACT

A suspension rubber bushing pivot installation for automobiles and the like incorporates an upsetting washer and expedients associated therewith in the bushing proper which coact under tightening of a fastener bolt to enhance the rattle-free frictional engagement of the latter with its supporting chassis bracket.

2 Claims, 1 Drawing Sheet

PIVOT BUSHING ASSEMBLY APPLICATION

The present invention deals with rubber "bushing" pivot assemblies for automotive road-wheel suspensions and like applications.

Typically, such pivot bushings comprise inner and outer metallic sleeves with an intervening rubber or elastomer cylindrical body of substantial thickness and, with the outer sleeve joined to a movable suspension member and the inner sleeve to a chassis support element, the pivot bushing provides a sturdy, long-life, non-lubricable pivot bearing meeting the challenges of automotive use. It is desirable in all instances to prevent relative movement in the joined parts other than through the flexure of the elastomer and, to this end, the inner sleeve is usually frictionally engaged or clamped at its opposite ends between spaced arms of the chassis support under the compression of a threaded bolt and nut fastener applied through aligned apertures of the support arms and the central through-bore of the inner sleeve.

Whether due to rust-preventing paints, waxes or like treatment of the chassis support or bushing, or due to other events, it is sometimes possible that the clamping compression on the inner sleeve from the mere tightening of conventional bolt fasteners will be insufficient for the desired frictional securement against the relative movement that might be induced in some high-force conditions in the vehicle.

By the present invention, a generally conventional pivot bushing is substantially improved to meet such conditions. The improved bushing incorporates an upsetting washer and associated expedients in the bushing inner sleeve cooperable with an otherwise conventional bolt and nut fastener to employ thread tightening of the latter in a way to deform, pinch and enhance the clamped engagement of the chassis support and inner sleeve together against relative movement under severe conditions.

The foregoing and other objects, features and advantages of the invention will be readily apparent from the following specification and from the drawings, wherein.

Figure 1:
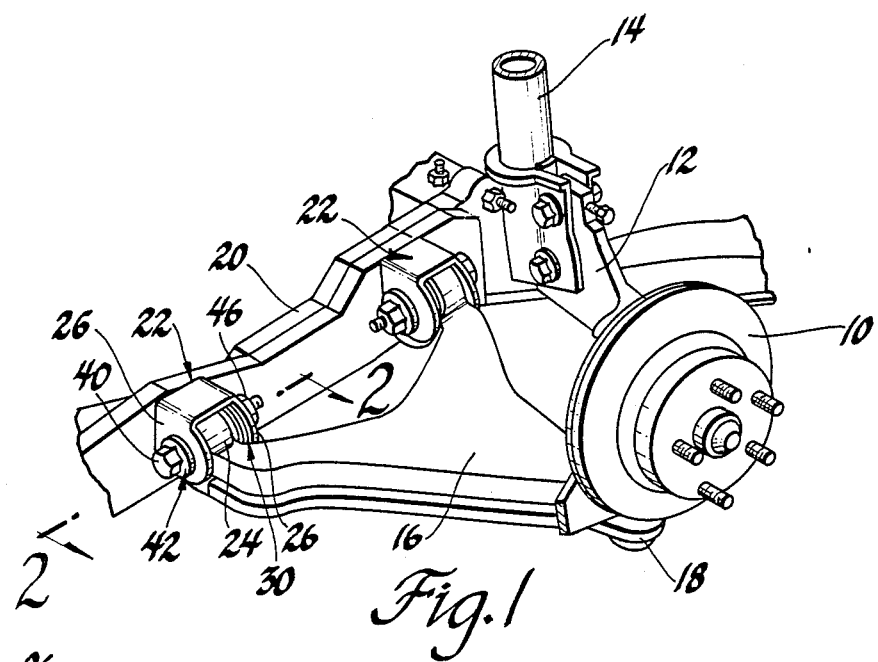
FIG. 1 is a fragmentary, perspective view of an automotive suspension assembly including a pivot bushing installation according to this invention.

Referring now to FIG. 1 of the drawings, the same illustrates a conventional automotive suspension assembly including a wheel carrier 10 rotatably mounted on a knuckle 12 affixed at its upper regions to a strut-type telescopic hydraulic damper 14. At its lower end regions, the knuckle 12 is suitably pivotally joined with the outboard end of a wishbone-style lower control arm 16, such lower joint being, for example, a ball joint 18. The control arm 16 conventionally requires pivotal mounting of its inboard regions on a longitudinal axis defined on the vehicle chassis understructure, such structure being indicated at 20. Thus, a spaced pair of generally U-section chassis brackets 22 extend from the understructure 20 generally aligned on such a longitudinal axis, and the inboard regions of control arm 16 comprise spaced wishbone legs which terminate in circular-section apertured bosses 24 each received between the legs of a respective bracket 22 to be pivotally joined thereto.

Figure 2:
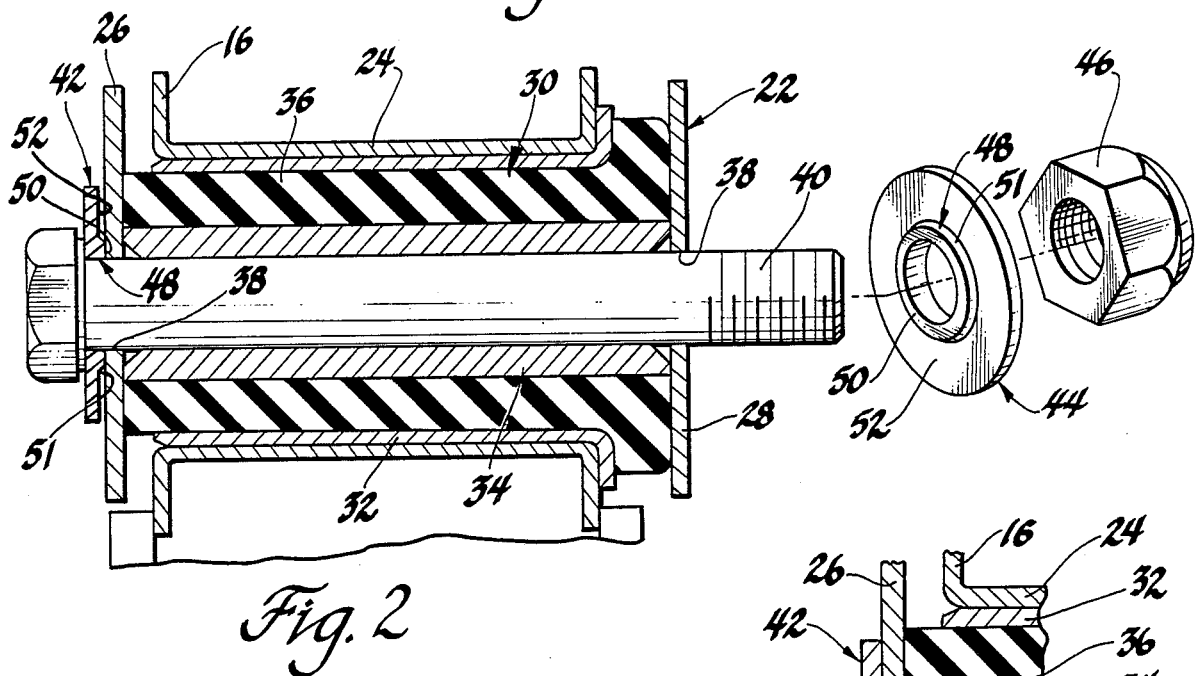
FIG. 2 is an enlarged sectional view, partly exploded, taken generally along the plane indicated by line 2—2 of FIG. 1.

A pivot bushing installation according to this invention accomplishes each such joint. Referring to FIG. 2, one joint is illustrated in a partially complete installation wherein numerals 26 and 28 indicate the laterally spaced pair of flanges or walls of the bracket 22.

A substantially conventional pivot bushing assembly 30 is, with its respective lower control arm boss 24, placed between such walls. The bushing assembly comprises an outer metallic sleeve 32 press fitted, spot-welded or otherwise relatively non-rotatably joined with boss 24, an inner metallic sleeve 34, and a rubber or other elastomer cylindrical body or bushing 36 between the two sleeves. As is conventional, inner sleeve 34 extends in length greater than the outer sleeve and generally equal the gap between walls 26 and 28. In this fashion, with a fastener bolt assembly installed to compress such walls onto the ends of the inner sleeve, such pressure typically serves to frictionally prevent relative motion of the inner sleeve on those walls during movement of the remainder of the pivot bushing, thereby to eliminate noise, wear, etc.

In contemplation of the present invention, a fastener bolt 40 indeed is placed through inner sleeve 34 and through apertures 38 aligned on a common axis of walls 26, 28. A pair of upsetting washers are placed one, indicated at 42, under the bolt head against wall 26, and the other, indicated at 44, over the threaded bolt end and under a fastening nut 46. The two washers are generally alike, washer 44 for example, including a generally frusto-conical protuberance or raised ring 48 featuring a flat end surface 50.

Figure 3:
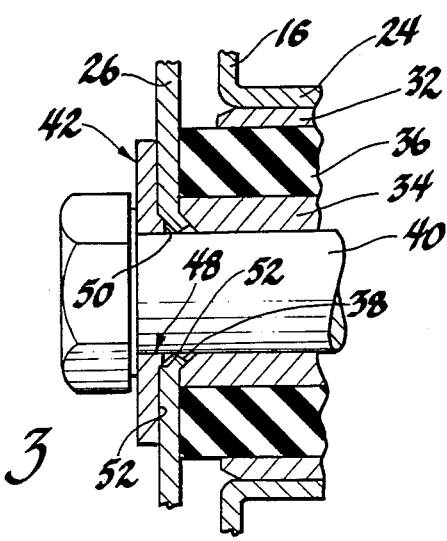
FIG. 3 is an enlarged view of a portion of FIG. 2.

Referring also to FIG. 3, each end surface of inner sleeve 34 features a generally conical chamfer 53 adapted for juxtaposition to raised ring 48 of either washer 42 or 44, and opening to the central bore of the sleeve with a largest diameter generally equal to the outer diameter of flat 50. The result is that, upon thread tightening of the bolt and nut fastener 40, 46, the usual frictional clamping of inner sleeve 34 between the bracket walls is enhanced by a deformation of the regions of walls 26, 28, immediate to the apertures 38 therein, inwardly into the chamfer-relieved ends of the sleeve. Simultaneously, the non-chamfered end surfaces of sleeve 34 are gripped in the normal manner under the pressure of the flat annular regions 52 of the washers 42, 44.

FIG. 3 illustrates the foregoing effect as accomplished in the completed installation by full thread tightening of the bolt fastener to a predetermined torque value. Of course, the material of washers 42, 44 is relatively substantially less deformable under the stress of such tightening than is the material of bracket 2, so as preferably to confine upsetting of material in the latter. Thus, the bracket may be of mild steel and the washers of substantially harder steel.

It will be appreciated that a variety of deforming expedients might be employed in the washers in preference to the specifically disclosed annular protuberance or raised ring 50, and that the chamfer 52 might be eliminated in favor of similar geometry in sleeve 34/bolt 40 accommodating and utilizing the particular deforming expedient chosen, all within the spirit of the invention.

The embodiments of the invention in which an exclusive property or privilege is claimed are defined as follows:

1. In a pivot bushing installation for automotive suspension apparatus and the like, including support means defining a spaced pair of walls of a material deformable under predetermined stress, the walls being apertured on a common axis for reception of a fastener bolt, the combination comprising, an elastomeric pivot bushing assembly received between said walls and including an inner metallic sleeve having its longitudinal bore aligned on said axis and its end surfaces adapted each for engagement with a respective said wall, centrally apertured upsetting washer means of a material relatively substantially less deformable under said stress than said wall material and including protuberance means adjacent the central aperture juxtaposed at the exterior of the respective one of said walls to an end surface of said sleeve, and threaded bolt and nut fastener means in the aligned apertures and bore of said walls, said sleeve and said washer means whereby under thread tightening of the fastener means said washer means is operable to deform the portion of said one wall intervening said protuberance means and said end surfaces of said sleeve to enhance frictional engagement of said sleeve between said walls.

2. In a pivot bushing installation for automotive suspension apparatus and the like, including support means defining a spaced pair of walls of a material deformable under predetermined stress, the walls being apertured on a common axis for reception of a fastener bolt, the combination comprising, an elastomeric pivot bushing assembly received between said walls and including an inner metallic sleeve having its longitudinal bore aligned on said axis and its end surfaces adapted each for engagement with a respective said wall, an end surface of said sleeve featuring chamfer means merging with such longitudinal bore, centrally apertured upsetting washer means of a material relatively substantially less deformable under said stress than said wall material and including an annular protuberance means adjacent the central aperture juxtaposed to said sleeve chamfer means at the exterior of the respective one of said walls, and threaded bolt and nut fastener means in the aligned apertures and bore of said walls, said sleeve and said washer means whereby under thread tightening of the fastener means said washer means is operable to deform the portion of said one wall intervening said annular protuberance and said chamfer means to enhance frictional engagement of said sleeve between said walls.

* * * * *